United States Patent [19]

Meinlschmidt

[11] Patent Number: 4,558,962
[45] Date of Patent: Dec. 17, 1985

[54] SNAP RING

[75] Inventor: Helmut Meinlschmidt, Kronungen, Fed. Rep. of Germany

[73] Assignee: SKF Kugellagerfabriken GmbH, Schweinfurt, Fed. Rep. of Germany

[21] Appl. No.: 679,564

[22] Filed: Dec. 7, 1984

[30] Foreign Application Priority Data

Dec. 23, 1983 [DE] Fed. Rep. of Germany ....... 3346661

[51] Int. Cl.⁴ ............................................. F16C 33/58
[52] U.S. Cl. .................................... 384/570; 384/561; 384/564
[58] Field of Search ............... 384/564, 570, 539, 561; 308/DIG. 11; 403/236, 155, 397; 411/352, 353, 517, 516, 518–530

[56] References Cited

U.S. PATENT DOCUMENTS

| | | | |
|---|---|---|---|
| 1,324,833 | 12/1919 | Lockwood | 384/564 |
| 1,512,020 | 10/1924 | Graham | 384/561 |
| 1,799,447 | 4/1931 | Taylor | 384/570 |
| 1,921,488 | 8/1933 | Smith | 384/570 |
| 1,970,449 | 8/1934 | Gibbons et al. | 384/570 |
| 2,069,569 | 2/1937 | Young | 384/570 X |
| 2,198,376 | 4/1940 | Cederberg | 384/564 |
| 3,495,496 | 2/1970 | Keim | |
| 4,270,815 | 6/1981 | Olschewski et al. | 384/561 |

FOREIGN PATENT DOCUMENTS 3005050  9/1980  Fed. Rep. of Germany .
924921  5/1963  United Kingdom ................ 411/517

*Primary Examiner*—Donald Watkins
*Assistant Examiner*—Thomas R. Hannon
*Attorney, Agent, or Firm*—Daniel M. Rosen

[57] ABSTRACT

A snap ring for axially holding an axially inserted machine element has a ring joint in the installed condition and is positioned with radial prestress in an annular groove formed in the bore of a ring, housing or the like. In order to ensure that the snap ring does not snap out of the annular groove when axial loading is exerted, the ring joint is formed by the interlocking of at least one projection formed on one end of the snap ring and a corresponding recess formed in the other end of the snap ring, each having oblique surfaces for preventing relative radial displacement between and for aligning the respective ends having the projection formed thereon and the recess formed therein.

12 Claims, 8 Drawing Figures

SNAP RING

FIELD OF THE INVENTION

The invention relates to a snap ring, in particular for holding axially insertable machine elements, the snap ring being provided with a ring joint and arranged in an annular groove, for example, in the bore of a ring, housing or the like, with radial prestress.

BACKGROUND OF THE INVENTION

It is known in the prior art, as disclosed in U.S. Pat. No. 1,970,449, to arrange an angled snap ring in an annular groove in the bore of the outer ring of a cylindrical roller bearing and to use it as a contact surface for axially holding the cylindrical rollers. This known snap ring has the disadvantage that one of the ends of the snap ring is lifted radially out of the annular groove upon axial loading of the bearing, as a result of the friction between the rolling bodies and the snap ring, even if the ring joint lies at an angle with respect to the longitudinal axis, following which the snap ring can snap out of the annular groove.

It is further known in the prior art, as disclosed in German patent publication No. 2830818, to arrange a spacer element between the facing ends of the ring joint in order to prevent springing of a slotted, adjustable contact ring out of a radial rolling bearing. This spacer element must additionally be fastened and secured.

SUMMARY OF THE INVENTION

The object of the present invention is to provide a snap ring of the aforementioned type which is simple to manufacture, can be installed without regard to the position of the ring joint, and in operation will not spring out of the annular groove upon axial loading.

This object is achieved by providing at least one projection and one recess on the mutually facing ends of a snap ring for forming a ring joint gap when the projection and recess are interlocked. Each projection has at least one pair of oblique surfaces for contacting corresponding oblique surfaces of the confronting recess. These oblique surfaces are arranged such that radial displacement is prevented between the ring end on which the projection is formed and the ring end in which the recess is formed.

In accordance with this construction, as soon as axial loading occurs, friction between the cylindrical rollers and the inner radial surface of the snap ring arises, as a result of which the one free end of the snap ring approaches the other free end and is bowed inwardly toward the bearing axis. During this movement, the projection abuts a surface of the recess and then slides further into the recess in the circumferential direction, until the free end on which the projection is formed is braced against the other free end in which the recess is formed, and the outer and bore surfaces of the two ring ends are respectively aligned. A ring arrangement of this type prevents the snap ring from snapping out of the annular groove.

Further advantageous embodiments of the invention will be described in detail hereinafter.

BRIEF DESCRIPTION OF THE DRAWINGS

The preferred embodiments in accordance with the invention will be described in detail with reference to the following drawings.

DETAILED DESCRIPTION OF THE PREFERRED EMBODIMENT

Figure 1:
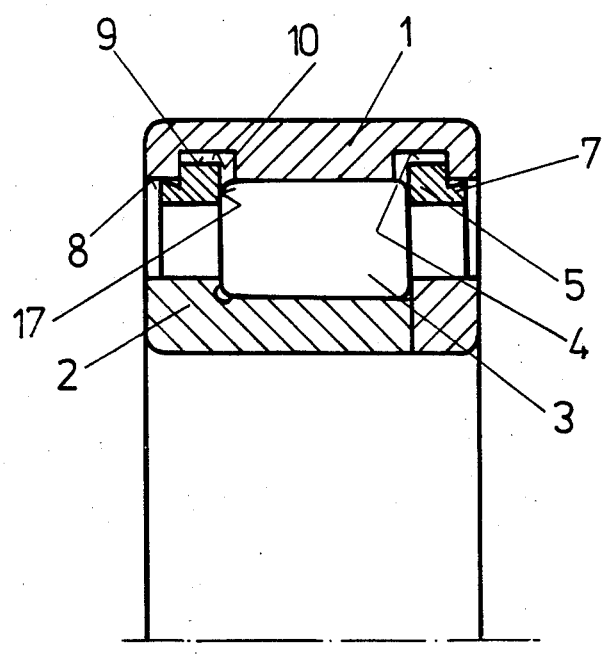
FIG. 1 is an axial section of a cylindrical roller bearing with a snap ring to provide a contact surface for the cylindrical rollers.
Figure 2:
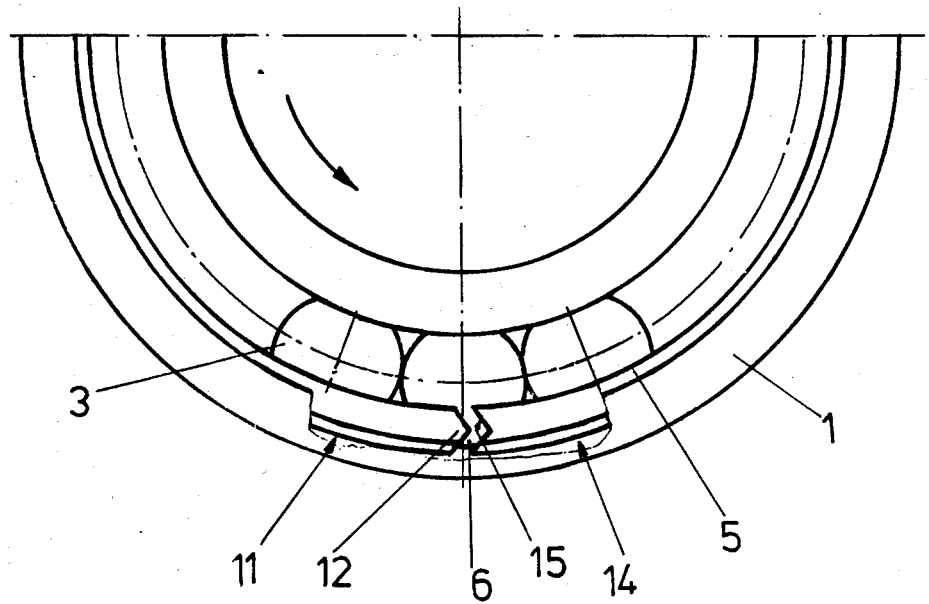
FIG. 2 is a partially sectioned side view of the cylindrical rolling bearing shown in FIG. 1.
Figure 3:
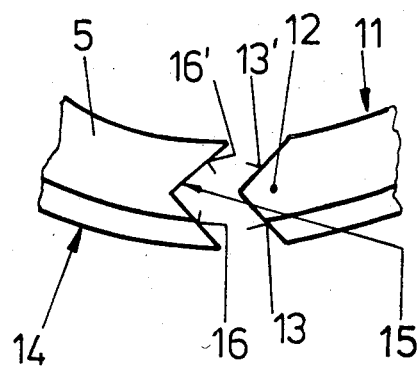
FIG. 3 is an enlarged view of the snap ring depicted in FIGS. 1 and 2 in the area of the ring joint.

The cylindrical rolling bearing according to FIGS. 1 and 2 comprises an outer ring 1, an inner ring 2, and cylindrical rollers 3 arranged between the bearing rings. The outer ring 1 is provided with annular grooves 4 in its bore at both ends of the raceway, in each of which a snap ring 5 is arranged to provide a contact surface. Each snap ring has a circumferential angled offset for engaging the outer rim of the respective annular groove 4. The snap ring 5 is slotted at one position along its circumference, the distance between the facing ends of the snap ring being sufficiently large when the ring joint 6 is in its non-interlocked condition, that the snap ring can be radially squeezed together and compressed in the annular groove 4. The shoulder 7 has an outer diameter enabling the snap ring 5 to abut the bore surface 8 of the outer ring 1 with radial prestress. However, there is radial play between the outer surface 9 of the snap ring 5 and the groove base 10 of the annular groove 4. As can be seen in FIG. 3 which shows an enlarged view of the snap ring, one end 11 of the snap ring is provided with a circumferentially directed projection having a pair of oblique surfaces 13, 13', whereas the other end 14 is provided with a recess 15 with oblique surfaces 16, 16' complementary to the surfaces 13, 13' respectively.

In a radially and axially loaded bearing in which the ring joint 6 of snap ring 5 is in the loaded zone, if the inner ring 2 rotates in the direction indicated by the arrow (see FIG. 2), the left end 11 of the snap ring 5 will curve in the circumferential direction toward the other free end 14 and radially toward the bearing axis, due to the friction of the cylindrical rollers 3 against the inner radial surfaces of the snap ring 5 until the surfaces 13' of end 11 abut the surfaces 16' of end 14. This interlocking abutment prevents radial slipping of the end 11 with respect to the end 14. Experiments have established the unexpected result that the projection 12 of the left end 11 is slid all the way into the recess 15, until it supports the other end 14 in the circumferential direction and the outer and bore surfaces of both rings ends 11 and 14 are flush. Thus, the snap ring is secured against being accidentally snapped out of the annular groove.

Figure 4:
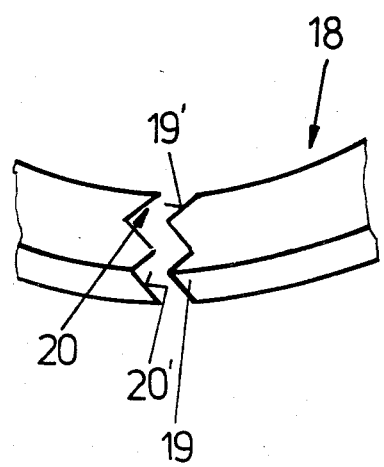
FIGS. 4–8 depict other shapes for the ends of the snap ring in accordance with the invention.
Figure 5:
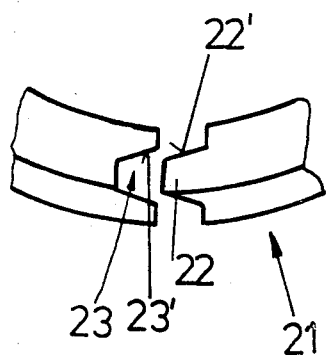

FIG. 4 shows the area of the ring joint of another modification of the snap ring 18, wherein one end is provided with projections 19, having surfaces arranged in a zig-zag pattern, which end will, in an axially loaded bearing, abut the corresponding surfaces 20' of recesses 20 formed in the other end, thereby forming an interlocking closure. FIG. 5 shows a snap ring 21 provided with a trapezoidal projection 22 having surfaces 22', which interlocks with a corresponding recess 23 having surfaces 23'.

Figure 6:
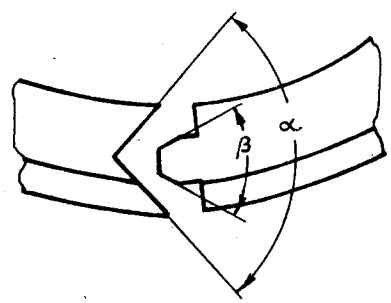

FIG. 6 shows a snap ring wherein the inclined surfaces of the recess define an angle $\alpha$ and the inclined surfaces of the projection define an angle $\beta$ such that $\alpha > \beta$.

Figure 7:
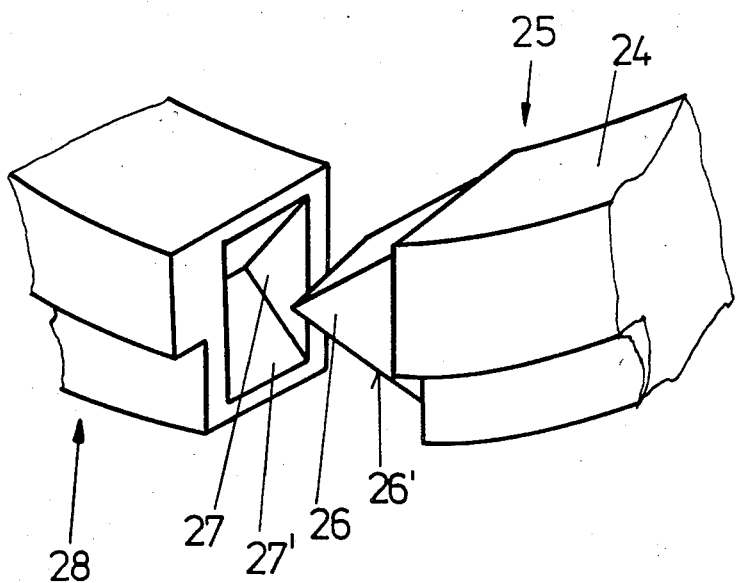

FIG. 7 shows another embodiment of the invention wherein the end 24 of snap ring 25 is provided with a prismatic projection 26 having surfaces 26', which interlocks with a corresponding recess 27 having surfaces 27' formed in the other end 28.

Figure 8:
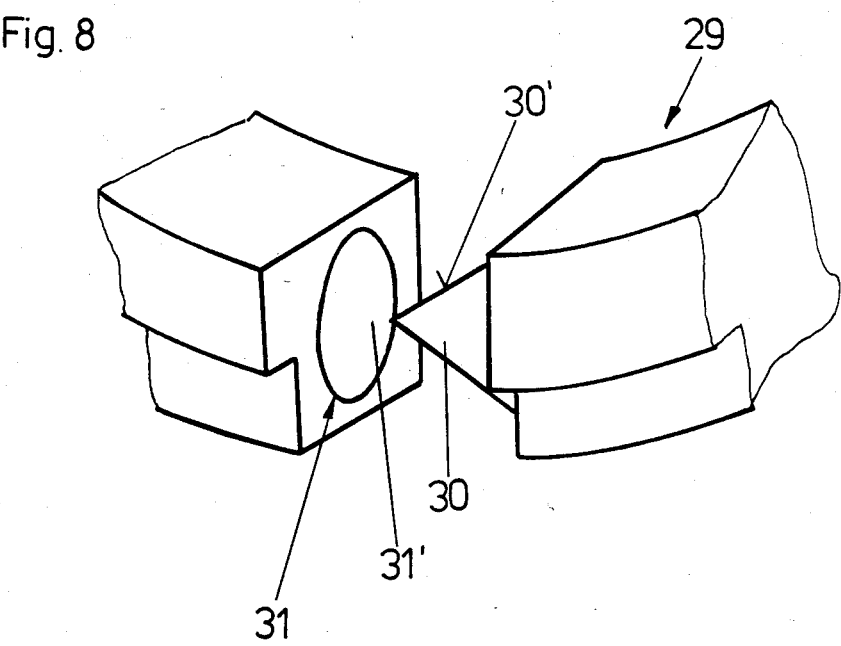

FIG. 8 shows a further embodiment of the invention wherein one end of the snap ring 29 has a conical projection 30 having an outer surface 30', which interlocks with a corresponding recess 31 having a bore surface 31'.

By means of the embodiments depicted in FIGS. 7 and 8, the ends of the snap ring are radially aligned and axially held.

The foregoing description of the preferred embodiments is presented for illustrative purposes only and is not intended to limit the scope of the invention as defined in the appended claims. Modifications may be readily effected by one having ordinary skill in the art without departing from the spirit and scope of the inventive concept herein disclosed. For example, the respective ends of the snap ring can alternatively be provided with a half-cylindrical projection for interlocking with a corresponding recess. Furthermore, it is possible to provide the respective ends with projections and recesses having corresponding wave-shaped profiles. The arrangement of the ends in accordance with the invention is applicable to not only angled snap rings, but also to normal snap rings having plane-parallel side surfaces. Moreover, the application of the snap ring according to the present invention is not limited to the function of providing an adjustable contact surface for the outer ring of a rolling bearing.

I claim:

1. In a snap ring for axially holding a machine element, the snap ring having a gap extending radially there through; the improvement wherein said gap is defined by mutually facing ends of said snap ring and said snap ring is prestressed in a direction to hold said ends separated from one another, one of said ends having a circumferentially extending projection thereon and the other of said ends having a recess extending in the circumferential direction therein, said projection having first and second oblique surfaces positioned to be circumferentially movable to engage corresponding third and fourth oblique surfaces in said recess by compression of said ring, said first, second, third, and fourth oblique surfaces extending in directions to prevent radial displacement of said end having the projection formed thereon with respect to said other end having the recess formed therein when said respective first and third and said second and fourth oblique surfaces are in contact.

2. A snap ring as defined in claim 1, wherein said oblique surfaces are not parallel to the circumferential direction.

3. A snap ring as defined in claim 1 wherein said projection further has fifth and sixth oblique surfaces arranged to engage corresponding seventh and eighth oblique surfaces in said recess, said fifth and sixth oblique surfaces extending in a direction to prevent axial displacement of said end having the projection formed thereon with respect to said end having the recess formed therein when said respective fifth and seventh and said sixth and eighth surfaces are in contact.

4. A snap ring as defined in claim 3 wherein said projection has a prismatic shape and said recess is shaped to receive said projection.

5. A snap ring as defined in claim 3 wherein said projection has a conical shape and said recess is shaped to receive said projection.

6. A snap ring as defined in claim 1 wherein said projection has an arrow-shaped profile and said recess is shaped to receive said projection.

7. A snap ring as defined in claim 1 wherein said projection has a zig-zag profile and said recess is shaped to receive said projection.

8. A snap ring as defined in claim 1 wherein said projection has a trapezoidal profile and said recess is shaped to receive said projection.

9. A snap ring as defined in claim 1 wherein said first and second oblique surfaces of said projection and said third and fourth surfaces of said recess form equal angles therebetween.

10. A snap ring as defined in claim 1 wherein said first and second oblique surfaces of said projection and said third and fourth surfaces of said recess form unequal angles therebetween.

11. A snap ring as defined in claim 1 wherein said snap ring comprises a contact ring adapted to be mounted in an annular groove in the bearing ring of a radial rolling bearing.

12. A snap ring as defined in claim 11 wherein said snap ring has an angled circumferential offset for engaging an edge of said annular groove.

* * * * *